June 23, 1936.  F. P. GOTTSCHALK  2,045,386
STATIONARY BLADE FOR LAWN MOWERS
Filed March 28, 1935
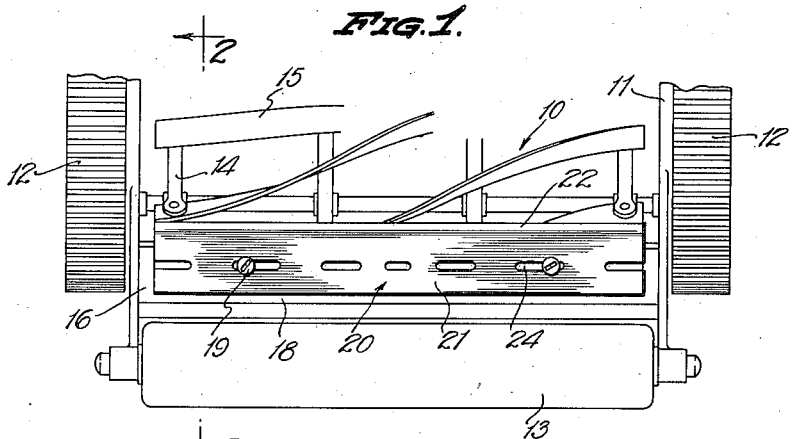
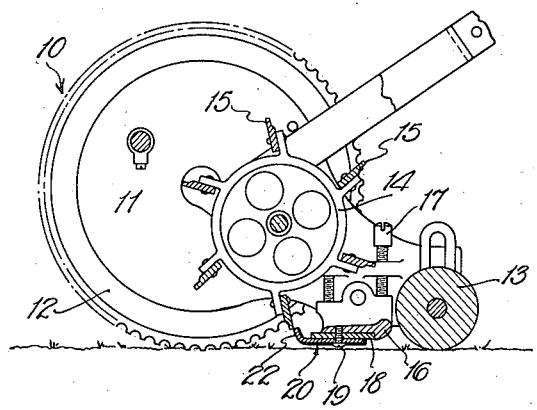
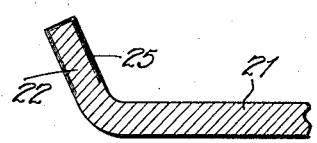
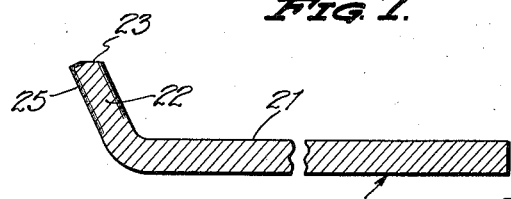
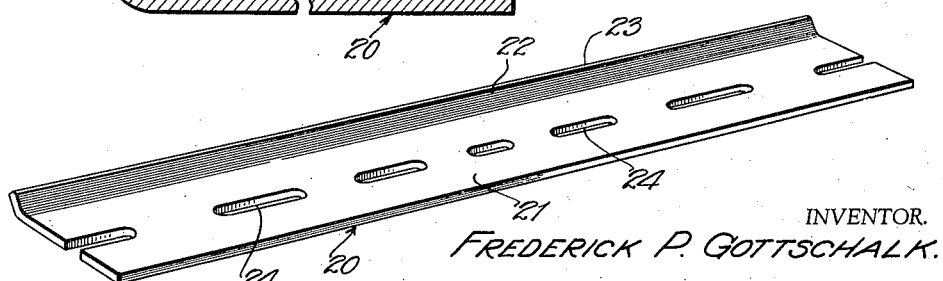
INVENTOR.
FREDERICK P. GOTTSCHALK.
BY
ATTORNEYS.
WITNESS:

Patented June 23, 1936

2,045,386

UNITED STATES PATENT OFFICE 2,045,386

STATIONARY BLADE FOR LAWN MOWERS

Frederick P. Gottschalk, Plainfield, N. J.

Application March 28, 1935, Serial No. 13,406

4 Claims. (Cl. 56—294)

This invention relates to lawn mowers, and more particularly to a stationary blade therefor.

This application is a continuation in part of my prior application Serial No. 683,277 filed August 2, 1933.

In the operation of the conventional construction of lawn mowers, the spiral rotary blades have wiping contact with the cutting edge of the rigid stationary blade to produce the desired cutting of the blades of grass therebetween. Although the stationary blade is constructed of hard metal, the cutting edge is gradually worn away, necessitating frequent adjustments to maintain the rotary blades and stationary blades in cutting relation, and in time the cutting edge becomes worn to such an extent that a bevel is formed on the upper face of the stationary blade over which the rotary blades pass, which impairs the cutting qualities of the lawn mower and increases the surface friction over which the rotary blades must pass. When such condition occurs, it becomes necessary for the entire upper face of the stationary blade to be ground in order to remove the bevel and restore the stationary blade to an efficient cutting condition. This grinding or sharpening of the stationary blade is a rather costly service and one which must be performed by an expert in the art. Therefore, the main object of this invention resides in an attachment which will eliminate the frequent sharpening of the stationary blade.

Another feature of the invention is to provide a replacement stationary blade which may be installed upon various makes of lawn mowers without any alterations in the construction thereof, and which may be mounted in position by one unskilled in the art.

A still further feature resides in a method of making a stationary cutting blade for lawn mowers, which is simple and inexpensive and which produces a cutting blade which is efficient of operation, and capable of long wear.

With these and other objects in view, the invention resides in the certain novel construction, combination and arrangement of parts, the essential features of which are hereinafter fully described, are particularly pointed out in the appended claims, and are illustrated in the accompanying drawing, in which:

Figure 1 is a bottom plan view of a conventional construction of lawn mower with my improved stationary blade in position thereon.

Figure 2 is a vertical sectional view on the line 2—2 of Figure 1.

Figure 3 is a perspective view of the stationary blade, per se.

Figures 4 to 6 inclusive are detail cross-sectional views illustrating the several steps practiced in the method of making the blade.

Figure 7 is an enlarged vertical transverse sectional view through the finished blade.

Referring to the drawing by reference characters, the numeral 10 designates a conventional construction of lawn mower which includes side plates 11, ground wheels 12, a back roller 13, a rotary cutting reel 14 having spiral blades 15, a stationary knife bar 16 pivoted to the side plates 11 and secured in an adjusted position by set screws 17, and a worn stationary knife blade proper 18 directly secured to the underside of the knife bar 16 by attaching screws 19. Ordinarily, in lawn mowers of this construction, the cutting edges of the rotary blades 15 coact with the front top edge of the stationary blade 18 to produce a cutting action, but in time the front edge of the stationary blade wears away requiring sharpening by grinding the entire upper face of the blade. The replacement stationary blade which I am about to describe overcomes the above sharpening operation and maintains the mower in efficient cutting condition at all times.

My replacement stationary blade is designated in its entirety by the numeral 20 and is shown per se in Figure 3 of the drawing. The blade is constructed of a relatively thin hard bendable resilient material such as sheet steel of a uniform thickness of approximately $\frac{3}{32}$ of an inch and includes a flat elongated body 21, one longitudinal edge of which is bent upwardly and outwardly to provide an angular knife blade 22 extending the length of the body. The angular knife blade 22 is disposed substantially radially with respect to the axis of the reel 14. The inner longitudinal edge of the blade 22 is ground flat and parallel to the upper face of the body and constitutes a flat cutting edge 23 for coaction with the rotary knives of the cutting reel as will be hereinafter explained. The flat body 21 is provided with spaced elongated slots 24 of varying lengths for receiving the attaching screws 19. Not all the slots 24 receive attaching screws, but the spacings and length of the slots will accommodate the attaching screws of different makes of lawn mowers, thus adapting the blade for use upon various makes of lawn mowers now on the market.

In Figures 4 to 7 inclusive, I have illustrated the several steps in the method of making the blade 20. In Figure 4, the blank of stock from which the blade is constructed is shown and designated by the letter A and is normally flat steel. One longitudinal edge of the blank stock A is bent its entire length at an angle of approximately 65 degrees and forms the flange 22 hereinbefore mentioned and which is approximately ¼ inch in height. The blank stock now takes the shape shown in Figure 5. The elongated slots 24 may be punched prior to or after bending of the flange 22.

After bending the blank to form the flange 22, I case harden the said flange to provide an extremely hard surface thereover as designated at 25 and shown in Figure 6.

After case hardening the flange, I grind off the inner top corner edge thereof as best seen in Figure 7 which causes the cutting edge 23 to normally start inwardly from the outer edge of the flange. This grinding off operation exposes the softer core of the flange 22 on the flat cutting edge 23 while retaining the hard shell on the inner and outer sides of the flange.

To apply the blade to a lawn mower, it is first necessary to turn the head of the lawn mower bottom up, whereupon the screws 19 are removed and the old blade 18 removed or may remain in position as shown in Figure 2. The blade 20 may now be placed in position with the flat body 21 against the knife bar 16, certain slots 24 registering with screw openings in the knife bar to permit passage of the screws 19 for threading engagement with the knife bar. Prior to the tightening up of the screws 19, the blade may be shifted lengthwise to correctly position the same with respect to the length of the rotary knives 15. The heads of the screws 19 are larger than the width of the slots 24, so that upon tightening of the screws, the heads engage the underside of the flat body 21 and secure the blade against movement.

By reference to Figure 2 of the drawing it will be seen that when the replacement blade is in position, the angular flange 22 extends beyond the bed plate 16. By adjusting the screws 17, the working edge 23 of the auxiliary blade may be set with respect to the cutting edges of the spiral knife blades 15 of the cutting reel, so that the spiral blades contact the length of the working edge 23 as the cutting reel rotates. The resiliency of the flange 22 is sufficient to guard against any excessive clashing between the rotary knife blades and the edge 23 to prevent jamming, but under ordinary cutting conditions and during the cutting of high or tough grass or weeds, the flange will remain rigid to coact with the rotary knife blades to produce the desired cutting action.

By case hardening the blade and grinding away a portion of the angular lip, I obtain outer hard edges and a soft inner or center core. The rotary blades of the reel cut crosswise of the upturned lip and by reason of the outer hardened edges thereof, the edges of the rotary blades are kept in a sharpened condition.

Wear of the cutting edge is compensated for by the adjustment of the set screws 17 which act to maintain the knife bar 16 in various positions of adjustment, and which facilitates the movement of the cutting edge 23 to a set position relative to the rotary cutting blades 15.

In view of the fact that lawn mowers are constructed of various length cutters, the replacement blade may be manufactured in different standard lengths to meet the requirements.

After once securing my replacement blade in position upon a lawn mower, there is no necessity to remove the same as the above adjustment is all that is necessary to maintain the lawn mower in efficient cutting condition, however when the flange 22 is fully worn away, the blade may be removed and a new one substituted therefor.

While I have shown and described what I deem to be the most desirable embodiment of my invention, I wish it to be understood that such changes as come within the scope of the appended claims may be resorted to if desired.

Having thus described the invention, what I claim as new and desire to secure by Letters Patent of the United States, is:—

1. A stationary knife blade for lawn mowers having a rotatable cutting reel, said stationary blade comprising a relatively thin flat steel body attachable to the mower and an upturned flange formed along one longitudinal edge of the body for cutting engagement by the blades of the reel, said flange having its upper edge beveled inwardly from the rear surface of the flange with the beveling terminating short of the front surface of the flange to provide a cutting surface on the top edge of the flange having a width less than the thickness of the flange, the surfaces of the flange other than the beveled portion being relatively hard to retard wear of the cutting surface.

2. A stationary knife blade for lawn mowers having a rotatable cutting reel, said stationary blade comprising a relatively thin flat steel body attachable to the mower and an upturned flange formed along one longitudinal edge of the body, and extended in a direction toward the axis of the reel said flange being case hardened and having a portion of the hardened surface of the upper edge removed to expose the relatively soft core of the flange, said exposed portion constituting a cutting surface on the top edge of the flange having a width less than the thickness of the flange, and the remainder of the top edge of the flange constituting a sharpening surface for the blades of the reel during the cutting operation.

3. A stationary knife blade for lawn mowers having a rotatable cutting reel, said stationary blade comprising a relatively thin flat steel body attachable to the mower and an upturned flange formed along one longitudinal edge of the body, the uppermost edge of the flange being contacted by the blades of the reel during the cutting operation and said uppermost edge having relatively hard and relatively soft surface portions, the relatively hard surface portion constituting a sharpening surface for the blades of the reel upon contact thereby.

4. A stationary knife blade for lawn mowers having a rotatable cutting reel, said stationary blade comprising a relatively thin flat steel body attachable to the mower and an upturned flange formed along one longitudinal edge of the body, the uppermost edge of the flange being contacted by the blades of the reel during the cutting operation and said uppermost edge having one longitudinal edge beveled to provide a cutting surface of a width less than the width of the flange for cooperating with the blades of the reel, the remaining portion of said upper edge, including the vertical sides of the flange being case hardened to retard wear of the flange.

FREDERICK P. GOTTSCHALK.